(12) United States Patent
Mariotti et al.

(10) Patent No.: US 7,945,909 B2
(45) Date of Patent: May 17, 2011

(54) INITIATING RECOVERY OF AN EXECUTING TASK USING HISTORICAL INFORMATION AND TASK INFORMATION

(75) Inventors: Andrea Mariotti, Menlo Park, CA (US); Andrew Ng, Fremont, CA (US); Kirpal Khalsa, Sunnyvale, CA (US); Vincent Mendocino, Burlingame, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1271 days.

(21) Appl. No.: 10/434,942

(22) Filed: May 9, 2003

(65) Prior Publication Data

US 2004/0226013 A1   Nov. 11, 2004

(51) Int. Cl.
*G06F 9/46* (2006.01)
*G06F 11/00* (2006.01)

(52) U.S. Cl. ............................ 718/100; 714/100; 714/47

(58) Field of Classification Search .................. 718/100; 370/254; 714/4, 55, 47
See application file for complete search history.

(56) References Cited

U.S. PATENT DOCUMENTS

| | | | |
|---|---|---|---|
| 6,618,817 B1 * | 9/2003 | Armstrong | 714/4 |
| 6,892,331 B2 * | 5/2005 | Da Palma et al. | 714/55 |
| 7,283,485 B2 * | 10/2007 | Wray | 370/254 |
| 2004/0205108 A1 * | 10/2004 | Tanaka | 709/201 |

FOREIGN PATENT DOCUMENTS

| | | |
|---|---|---|
| EP | 0647903 A1 | 4/1995 |
| WO | WO 00/67157 | 11/2000 |

OTHER PUBLICATIONS

Smith et al., Predicting Application Run Times Using Historical Information, Job Scheduling Strategies for Parallel Processing, 1998, Springer Berlin / Heidelberg, vol. 1459/1998, pp. 122-142.*
Kavi, et al., "A Performability Model for Soft Real-Time Systems", *Proceedings of the Twenty-Seventh Annual Hawaii International Conference on System Sciences*, pp. 571-579, Jan. 4, 1994.
Ali, et al., "Task Execution Time Modeling for Heerogeneous Computing Systems", *Heterogeneous Computing Workshop 2000*, Proceedings. $9^{th}$ Cancun Mexico, May 1, 2000, Los Alamitos, California, USA, pp. 185-199.
Wellman, et al., "Price Prediction in a Trading Agent Competition," University of Michigan Artificial Intelligence Laboratory, Nov. 30, 2002, pp. 1-15.
Darin Anderson, "Providing Fault Tolerance in Distributed Systems" University of Minnesota, Morris, 6 pages, 2000.
International Search Report for International Application No. PCT/US2004/013920, mailed Oct. 6, 2004.
Transmission of Communication from European Patent Office pursuant to Article 94(3) EPC for European Patent Application 04 751 338.7-1225, mailed Nov. 25, 2009.
Communication under Rule 71(3) issued in European Application No. 04751338.7 on Jul. 23, 2010; 46 pages.

* cited by examiner

*Primary Examiner* — Meng-Ai An
*Assistant Examiner* — Eric C Wai
(74) *Attorney, Agent, or Firm* — Fish & Richardson P.C.

(57) ABSTRACT

Systems and techniques to manage tasks in a data processing environment. In general, in one implementation, the technique includes monitoring a task in a data processing environment and, using an instance of a distributed application, assessing when to initiate recovery of the monitored task based on an expected execution time derived using the task's associated class and historical execution times. In another implementation, the technique includes forecasting an execution time of a task in a data processing environment using a class of the task and historical task execution times as input into a statistical analysis tool comprising multiple interconnected processing elements and servicing the task based on the forecast execution time.

38 Claims, 8 Drawing Sheets ively. Fault tolerance also
INITIATING RECOVERY OF AN EXECUTING TASK USING HISTORICAL INFORMATION AND TASK INFORMATION

BACKGROUND

The following description relates to the management of tasks in a data processing environment.

A fault in a data processing environment can result in a range of problems of differing severity. For example, a fault in a processor can cause the processor to cease execution or continue executing but yield incorrect results. In some circumstances, a fault can cause one or more nodes of a data processing system to fail, thereby crippling or incapacitating the system.

The fault tolerance of a data processing environment is the ability of the environment to abide a fault. For example, a fault tolerant data processing system can, under certain circumstances, prevent itself from crashing or a data processing landscape can continue to process data even in the event of a malfunctioning or incapacitated node. Fault tolerance also may include the ability of a data processing system to behave in a well-defined manner when a fault occurs. Fault tolerance can be achieved, e.g., by masking a faulty component or by performing responsive or corrective measures upon detection of a fault.

A data processing environment can provide fault tolerance using different systems and techniques. For example, fault tolerance can be implemented using redundant elements, recovery based on failure semantics, and group failure masking. Redundancy is the duplication of system elements (e.g., system data, system hardware components, and/or system data processing activities) to prevent failure of the overall data processing environment upon failure of any single element. Recovery based on failure semantics includes recognizing a failure of a system element based on a description of the failure behavior of that system element. Group failure masking, another fault tolerance technique, includes masking a failure using a group of nodes. For example, multiple instances of a particular data processing server can run on different nodes of a data processing environment. If one node becomes unreachable due to a failure or even a delay in the transfer of data within the data processing environment, a second node that runs a second instance of that data processing server can provide the service.

SUMMARY

The present application describes systems and techniques relating to managing performance of a task in a data processing environment to improve the fault tolerance of the data processing environment.

In one aspect, a method includes monitoring a task in a data processing environment and, using an instance of a distributed application, assessing when to initiate recovery of the monitored task based on an expected execution time derived using the task's associated class and historical execution times.

This and other aspects can include one or more of the following features. Assessing when to initiate recovery can be based on the expected execution time derived using an artificial neural network. Assessing when to initiate recovery can include requesting a communication from a data processor handling the task or from a thread that includes the task.

The historical execution times can be updated based on an execution of the task in the data processing environment. The expected execution time can be determined by, e.g., obtaining a correlation between the task's associated historical execution times and class and historical information relating to the environment during the prior executions. The correlation can be obtained by determining the correlation, e.g., by establishing weights of connections between processing units in an artificial neural network.

Monitoring execution of the task can include monitoring execution of the task on a same server that handles the instance of the distributed application. The selection of tasks for execution by a data-processing server can be non-deterministic. Assessing when to initiate recovery can be based on an expected execution time derived using current information describing the data processing environment or it can be based on an expected execution time derived using a current load on the data processing environment. The execution of the task can be monitored in a thread executing on a data processing system in a distributed environment.

In another aspect, an article can include a machine-readable medium storing instructions operable to cause one or more machines to perform operations. The operations can include forecasting an execution time of a task in a data processing environment using a class of the task and historical task execution times as input into a statistical analysis tool comprising multiple interconnected processing elements and servicing the task based on the forecast execution time.

This and other aspects can include one or more of the following features. The execution time can be forecast using the historical task execution times and the class of the task as input into an artificial neural network or by estimating a workload on the data processing environment. The workload can be estimated based on current information regarding the data processing environment as input into a cortex of the statistical analysis tool. The cortex can include multiple interconnected processing elements.

Forecasting the execution time can include estimating a percent completion of the task. This can be done, e.g., by estimating the percent completion based on the class of the task and the historical task execution times as input into a cortex of the statistical analysis tool. Servicing the task can include assessing when to initiate recovery of the task based on the forecast execution time, initiating recovery of the task, and/or requesting a communication from a data processor handling the task or from a thread that includes the task.

The operations can also include updating the historical information based on an execution of the task in the data processing environment or obtaining a correlation between the historical task execution times and the class of the task in the prior executions and historical information relating to the data processing environment during the prior executions. The correlation can also be obtained by determining the correlation between the historical task execution times and the class of the task in the prior executions and historical information relating to the data processing environment during the prior executions as input into a statistical analysis tool comprising multiple interconnected processing elements.

The execution time of the task can be forecast using information relating to the data processing environment during a present execution or using information relating to an application server handling the task.

In another aspect, a system can include multiple application servers in a distributed data processing environment and a historical database. The data processing environment can run multiple instances of a recovery engine, and the historical database can be communicatively coupled with the multiple instances of the recovery engine. The instances of the recovery engine can collaboratively monitor tasks in the multiple application servers and assess when to initiate recoveries based on expected task execution times derived using historical task data included in the historical database.

This and other aspects can include one or more of the following features. The multiple instances of the recovery engine can collaboratively monitor the tasks without direct communication until a problem is detected. The expected task execution times can include a historical execution time related to a class of a specific task and to a handling application server among the multiple application servers.

An instance of the recovery engine can include a forecast parameter determination unit to determine a correlation between multiple historical execution times and handling application servers for the class of the specific task. The forecast parameter determination unit can be a trainer of an artificial neural network. The historical database can include historical task data written into the historical database by the multiple instances of the recovery engine. The multiple instances of the recovery engine can be clones of the recovery engine.

The described systems and techniques can be implemented to realize one or more of the following advantages. Management of tasks can be distributed in a distributed data processing environment, making task management robust. For example, if a data processing device in the distributed environment is incapacitated, then task management can still be performed at other data processing devices in the distributed environment. Moreover, each data processing system or device in the environment can, at one time or another, manage the performance of tasks at any of the other data processing systems or devices in the environment.

The management of tasks can be based on a variety of characteristics of the distributed processing environment, characteristics of specific data processing systems and devices in the environment, and characteristics of the tasks themselves. These characteristics can be used in conjunction with a historical record of task execution in the environment and in the systems and devices in the environment to forecast an execution time of the task. The forecast execution time can be used to determine if a data processing system or device, or a collection of processing activities that includes the task, has failed.

Machine-readable instructions for the management of tasks can be operable to cause one or more machines to propagate the instructions to one or more data processing systems and devices in an environment. These instructions can be self-contained in that they include instructions for determining a correlation between the execution time of the task and a variety of characteristics, instructions for using determined correlations to forecast the execution time of a task in the environment, and instructions for monitoring the task to compare the current execution time with the forecast execution time. The machine-readable instructions can also be propagated to data processing systems that are newly added to the distributed environment.

The machine-readable instructions can themselves be operable to cause one or more machines to assemble the historical record of task execution. The execution time of current tasks can be based upon this historical record of task execution assembled by the instructions. The sufficiency of the historical record can be examined to determine if management of tasks is to be based upon forecasts made using the historical record. If the historical record is found to be insufficient, the management of tasks can be based on other, alternative assessments of the expected execution time of tasks in the system.

The correlation between the execution time of the task and the characteristics can be determined periodically (e.g., every 30 seconds or so) and forecasts can adapt to changes in the environment, changes in the data processing system handling the task, or changes in the task itself. The forecast of the execution time can be made using multiple interconnected processing elements. The processing elements can be interconnected in parallel, which may tend to increase the speed at which forecasting can occur.

Multiple, instances of a task management engine can be distributed to multiple systems in a data processing environment. The instances can manage task execution in parallel without communicating. The instances can also communicate with each other, e.g., when a problem is detected. If one of the instances is lost or unable to communicate, the other instances can continue to manage the execution of tasks, making task management robust.

Even a single instance of a task management engine can manage the execution of tasks in the data processing environment to improve the fault tolerance of the data processing environment. Even if multiple systems in such an environment cease operations, a single system can recover uncompleted tasks and preserve system execution integrity.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The described systems and techniques relate to the management of tasks in a data processing environment. A data processing environment includes one or more data processing devices and/or data processing systems. A task is a unit of data processing activity that is implemented by a set of sequentially executed operations. The unit of data processing activity corresponding to a task can be an entire program, successive invocations of a program, or process constituents of a program. Execution of task operations can include the handling of both compiled program code and uncompiled or interpreted code.

Figure 1:
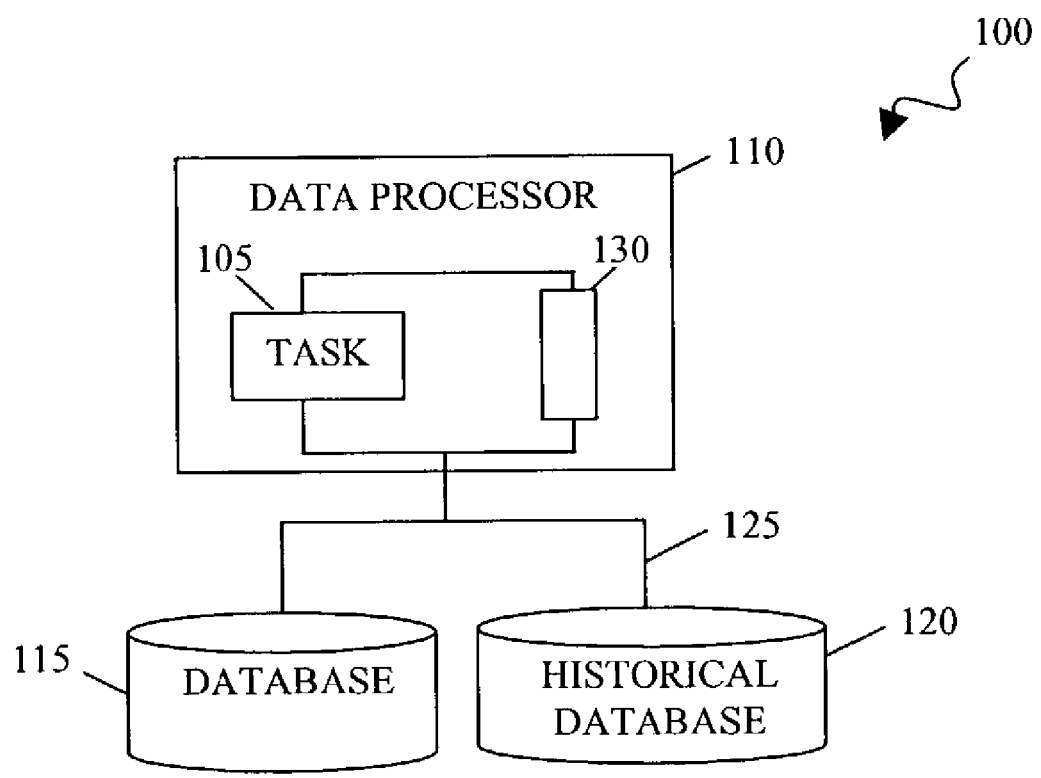
FIG. 1 shows an example data processing environment.

FIG. 1 shows one example of a data processing environment 100 in which a task 105 is managed. Data processing environment 100 includes a data processor 110, a database 115, a historical database 120, and a data link 125. Data processor 110 can be a data processing device and/or software that performs processing activities such as execution of task 105 in accordance with the logic of a set of machine-readable instructions. For example, the data processor 110 can be an application server. Database 115 is a memory device or server that can store instructions and data for processing activities such as task 105 in machine-readable format. Data link 125 allows instructions and data regarding processing activities to be exchanged between data processor 110, database 115, and historical database 120. Data link 125 can be a bus or a data communication link in a network.

In addition to task 105, data processor 110 also performs processing activities for managing task 105, namely a task management engine 130. Task management engine 130 manages the performance of task 105 by forecasting an expected duration of task 105 and comparing the expected duration with the actual duration of task 105. Task management engine 130 forecasts the expected duration based on a historical record of task performance in data processing environment 100. The historical record of task performance can be stored at historical database 120, which may be accessible by data processor 110 over data link 125.

Another example of a data processing environment in which tasks can be managed is a distributed data processing system. A distributed data processing system is a collection of distributed data processing devices, software, and/or systems (hereinafter "data processing systems") that operate autonomously yet coordinate their operations across a data communication link in a network. By operating autonomously, the data processing systems can operate in parallel, handling local workloads of data processing tasks. The data communication link allows information regarding the tasks, including the results of performance of the tasks, to be exchanged between data processing systems. To these ends, many distributed data processing systems include distributed databases and system-wide rules for the exchange of data.

Figure 2:
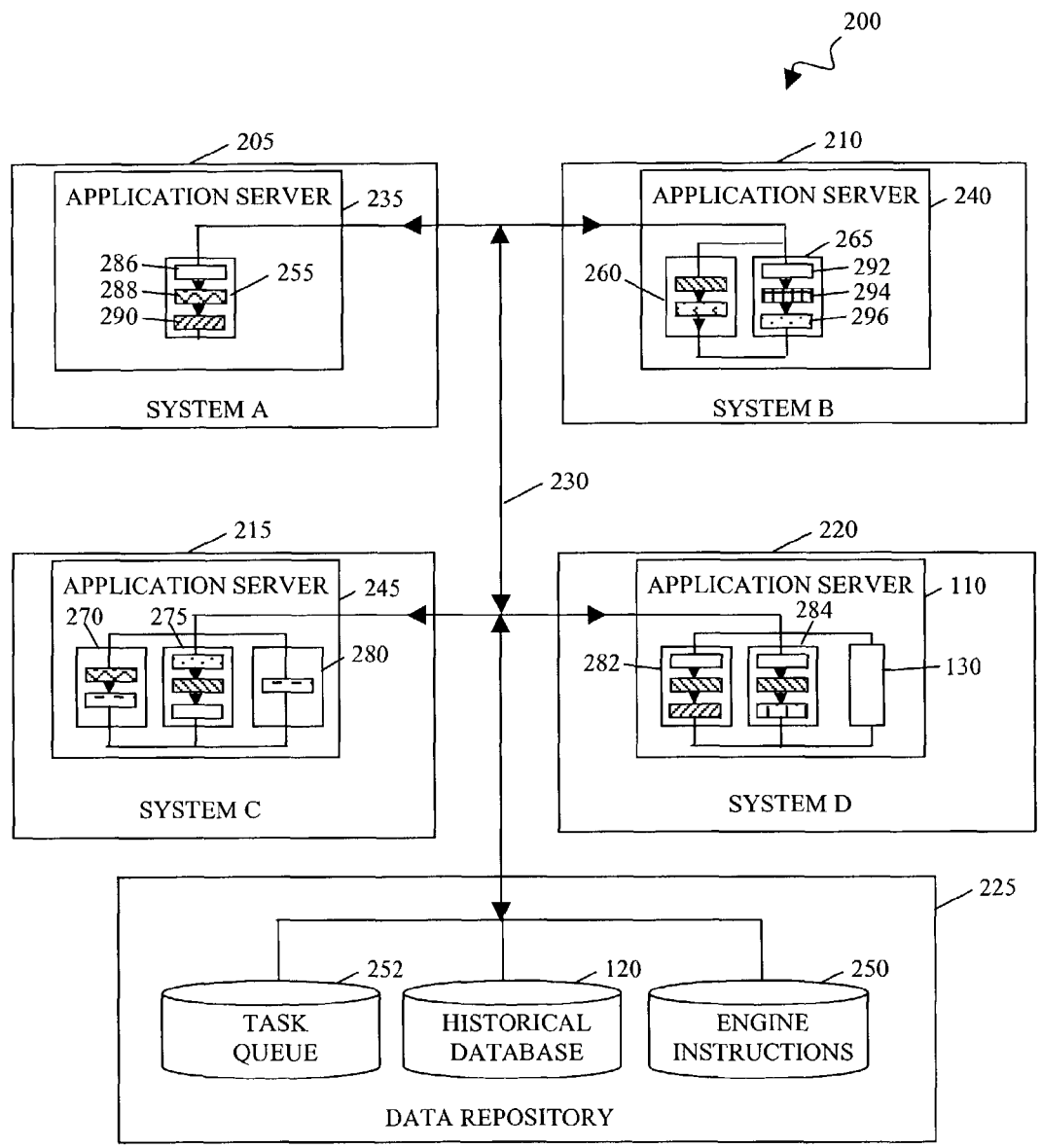
FIG. 2 shows an example distributed data processing environment.

FIG. 2 is a block diagram illustrating a distributed data processing environment 200. Environment 200 includes autonomous data processing systems 205, 210, 215, 220, a data repository 225, and a data communication link 230. Data processing systems 205, 210, 215, 220 can operate in parallel yet coordinate their activities by communicating information relating to the performance of those activities over data link 230. In particular, data processing system 205 includes an application server 235. Data processing system 210 includes an application server 240. Data processing system 215 includes an application server 245. Data processing system 220 includes data processor 110 (acting as an application server). Application servers 235, 240, 245, 110 can process data concurrently.

Data processing systems 205, 210, 215, 220 can coordinate their processing to achieve a common end. For example, data processing systems 205, 210, 215, 220 can form a federated data processing system where systems 205, 210, 215, 220 are similar and interoperate to achieve a common end. Data processing systems 205, 210, 215, 220 can establish one or more client/server relationships, including acting as clients or responding to requests for services from others. Data processing systems 205, 210, 215, 220 also can process data independently of one another and exchange information upon completion of the processing, if at all. For example, data processing systems 205, 210, 215, 220 can exchange information via database updates to data repository 225.

Data repository 225 can be a separate database system, data repository 225 can be included in one of data processing systems 205, 210, 215, 220, or data repository 225 can be distributed to two or more of data processing systems 205, 210, 215, 220 and synchronized accordingly. Data repository 225 can be one or more discrete data storage devices that stores engine instructions 250, a task queue 252, and historical database 120. Engine instructions 250 are machine-readable instructions for performing all or a portion of task management engine 130. Task queue 252 is a description of tasks performed in data processing environment 200 that are suitable for management by task management engine 130. Task queue 252 can be a table identifying individual tasks and the handling data processor.

One technique for coordinating the processing of data processing systems 205, 210, 215, 220 is through the use of threads. Threads are self-contained pools of resources allocated to a process by a data processing system. One program can include multiple threads. Threads that form a single program can be assigned to and performed by multiple processing systems, such as data processing systems 205, 210, 215, 220. Also, a single data processing system, such as each data processing system 205, 210, 215, 220, can process multiple threads simultaneously. The execution of threads at data processing devices can be asynchronous in that execution occurs jointly without explicit synchronization of execution state of the devices. Thus, a data processing system can handle multiple threads in one or more programs, running at the same time and performing different tasks.

FIG. 2 illustrates the handling of multiple threads by data processing systems 205, 210, 215, 220 in data processing environment 200. In particular, application server 235 in data processing system 205 handles a thread 255. Application server 240 in data processing system 210 handles threads 260, 265. Application server 245 in data processing system 215 handles threads 270, 275, 280. Application server 110 in data processing system 220 handles threads 282, 284.

These threads can include one or more sequential tasks. Different threads can include the same or similar tasks. For example, thread 255 includes tasks 286, 288, 290 and thread 265 includes tasks 292, 294, 296. Task 286 and task 292 are the same processing steps even though they are included in two different threads 255, 265. Task queue 252 can include a description of the active threads and tasks in data processing environment 200.

The failure of any of data processing systems 205, 210, 215, 220 to perform a task correctly can have a variety of consequences. For example, if thread 255 is a portion of a set of data processing activities that is being managed by application server 240 and application server 235 fails while handling thread 255, then application server 240 will not receive the results of the performance of thread 255. The failure of application server 235 can delay application server 240 from performing the remainder of the set of data processing activities while application server 240 awaits the results of thread 255.

In order to manage such faults, data processing environment 200 performs processing activities for managing the performance of tasks. In particular, application server 110 performs engine instructions 250 that constitute management engine 130. Task management engine 130 can manage the performance of a task anywhere in environment 200 by receiving the task from task queue 252, forecasting an expected duration of the task, and comparing the expected duration with the actual duration of the task. Management engine 130 forecasts the expected duration based on a historical record of task performance in data processing environment 200. The historical record of task performance can be stored at historical database 120.

Additionally, the management engine 130 can be distributed across all the systems in a distributed system, such as described below. A separate instance of the management engine 130 can be inside the application servers 235, 240, 245 and 110, such as described below in connection with FIG. 6. These management engine instances can operate in synergy to achieve the overall goal of task management. The engine instances need not communicate with each other directly until a problem is detected. Thus, the distributed system can continue to function despite the loss of one or more of the data processing systems 205, 210, 215, 220. Further, with asynchronous thread execution, data processing, including the recovery of crashed systems and threads, can continue at functioning data processing systems. Even if all but one of the data processing systems crash, the distributed system can still perform the recovery process and ultimately restore its state to the state before the one or more system crashes occurred.

Figure 3:
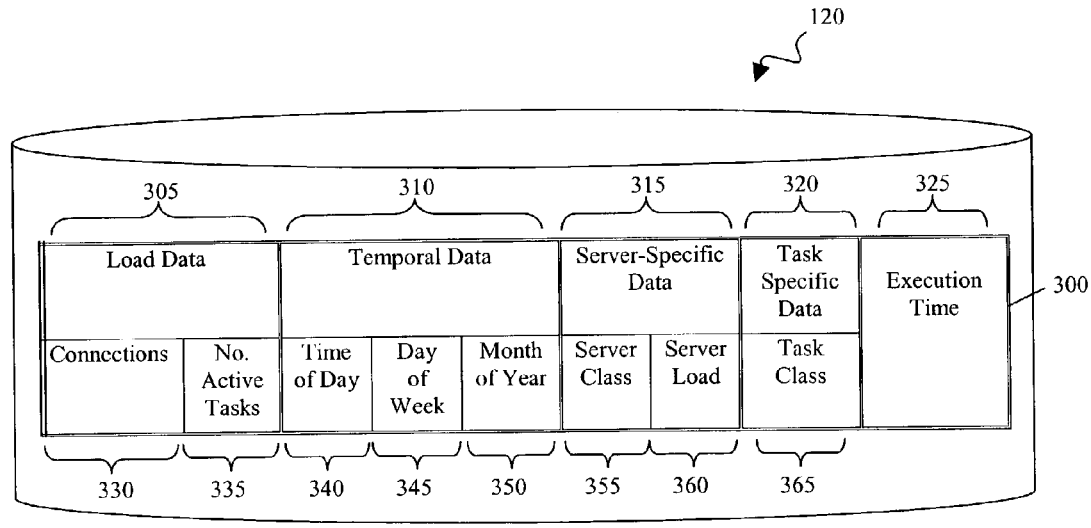
FIG. 3 shows example data that can form a historical record of the performance of tasks in the data processing environment of FIG. 1.

FIG. 3 illustrates an example historical record 300 of task performance in either of data processing environments 100, 200. Historical record 300 can be stored in machine-readable format in a historical database 120. Record 300 includes data 305 describing characteristics of a load on a data processing environment during a prior performance of a task, data 310 describing the time of the prior performance, data 315 describing characteristics of a server during the prior performance, data 320 describing characteristics of the task, and data 325 describing the execution time of the prior performance. Load data 305 can include data 330 that describes a number of connections to the data processing environment and data 335 that describes a total number of active tasks during the prior performance. Temporal data 310 can include data 340 that describes the time of day of the prior performance, data 345 that describes the day of the week of the prior performance, and data 350 that describes the month of the year of the prior performance. Server-specific data 315 can include data 355 that describes a class of the server that performed the task and data 360 that describes a load on the server during the prior performance. Task-specific data 320 can include data 365 that describes the class or type of the task that is performed.

Record 300 can be a table with each record corresponding to a previously performed task. Any of data 330, 335, 340, 345, 350, 355, 360, and 365 can form a key field in the table.

Figure 4:
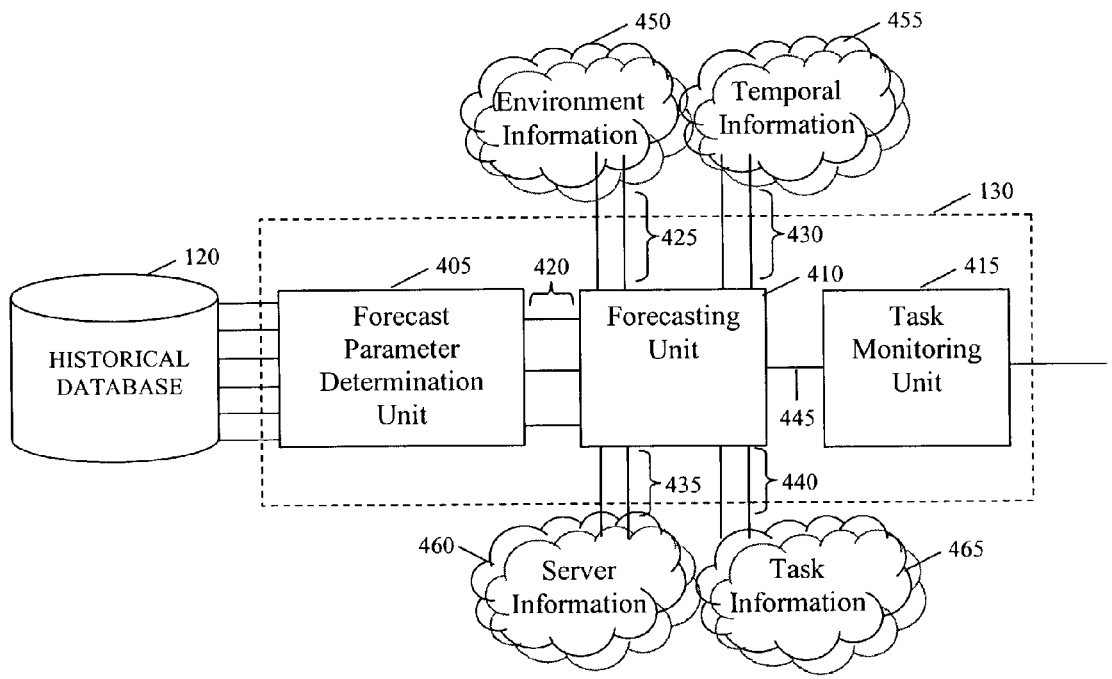
FIG. 4 is a schematic representation of an example task management engine that can forecast the expected duration of processing activities using a historical record of the performance of tasks.

FIG. 4 is a schematic representation of management engine 130 that forecasts the expected duration of tasks based on a historical record of task performance. Management engine 130 includes a forecast parameter determination unit 405, a forecasting unit 410, and a task monitoring unit 415. Forecast parameter determination unit 405 has one or more outputs 420 that are input into forecasting unit 410. Forecasting unit 410 also includes one or more environment information inputs 425, one or more temporal information inputs 430, one or more server information inputs 435, one or more task information inputs 440, and an execution time forecast output 445. Execution time forecast output 445 is input into task monitoring unit 415 which can receive and transmit information over a data link.

In operation, forecast parameter determination unit 405 accesses historical data such as historical record 300 (FIG. 3) at historical database 120 to receive historical information relating to the performance of tasks. Using the received historical information, unit 405 can determine forecast parameters used to forecast the execution time of a task on a processing system. Forecast parameters thus express the correlation between the other types of historical data and the previous execution times.

To determine the forecast parameters, unit 405 can analyze the historical record of task performance in order to determine the forecasting parameters using statistical analysis approaches. For example, predetermined rules and statistical analysis approaches can be used to determine a correlation coefficient between the month of the year and the execution time of a task and a correlation coefficient between the time of day and the execution time of the task. Moreover, the unit 405 can determine the forecast parameters using artificial neural network techniques, as discussed further below.

Forecasting unit 410 receives the forecast parameters from forecast parameter determination unit 405. Forecasting unit 410 also receives current information about the data processing environment as environment information 450, which describes characteristics of the current load such as the current number of connections, the number of currently active tasks, and the current workload associated with determining the forecast parameters. Forecasting unit 410 receives temporal information 455 that describes the current time, such as the current time of day, day of the week, and month of the year. Forecasting unit 410 also receives server information 460 that describes current characteristics of the server such as the server class and the current server load. Forecasting unit 410 receives task information 465 that describes current characteristics of the task for which execution time is to be forecast such as the class or type of the task.

Forecasting unit 410 can receive current information 450, 455, 460, 465 from any of a variety of sources. For example, temporal information 455 can be received from the application server that performs management engine 130. Server information 460 can be received from the data processing system being monitored. Environment information 450 can be received, in part or in whole, from any or every data processing system in environment 200. Information 450, 455, 460, 465 can thus be received, in whole or in part, over either of data links 125, 230.

With the received forecast parameters and current information 450, 455, 460, 465 about the data processing environment, forecasting unit 410 forecasts an execution time of a task. Forecasting unit 410 then relays the forecast execution time to task monitoring unit 415 over forecast output 445. Task monitoring unit 415 receives the forecast execution time and monitors the execution of a task at one or more of the application servers of the data processing environment. Task monitoring unit 415 can monitor the execution of a task to determine, e.g., the actual execution time of the task has exceeded the forecast execution time received from forecasting unit 410.

Figure 5:
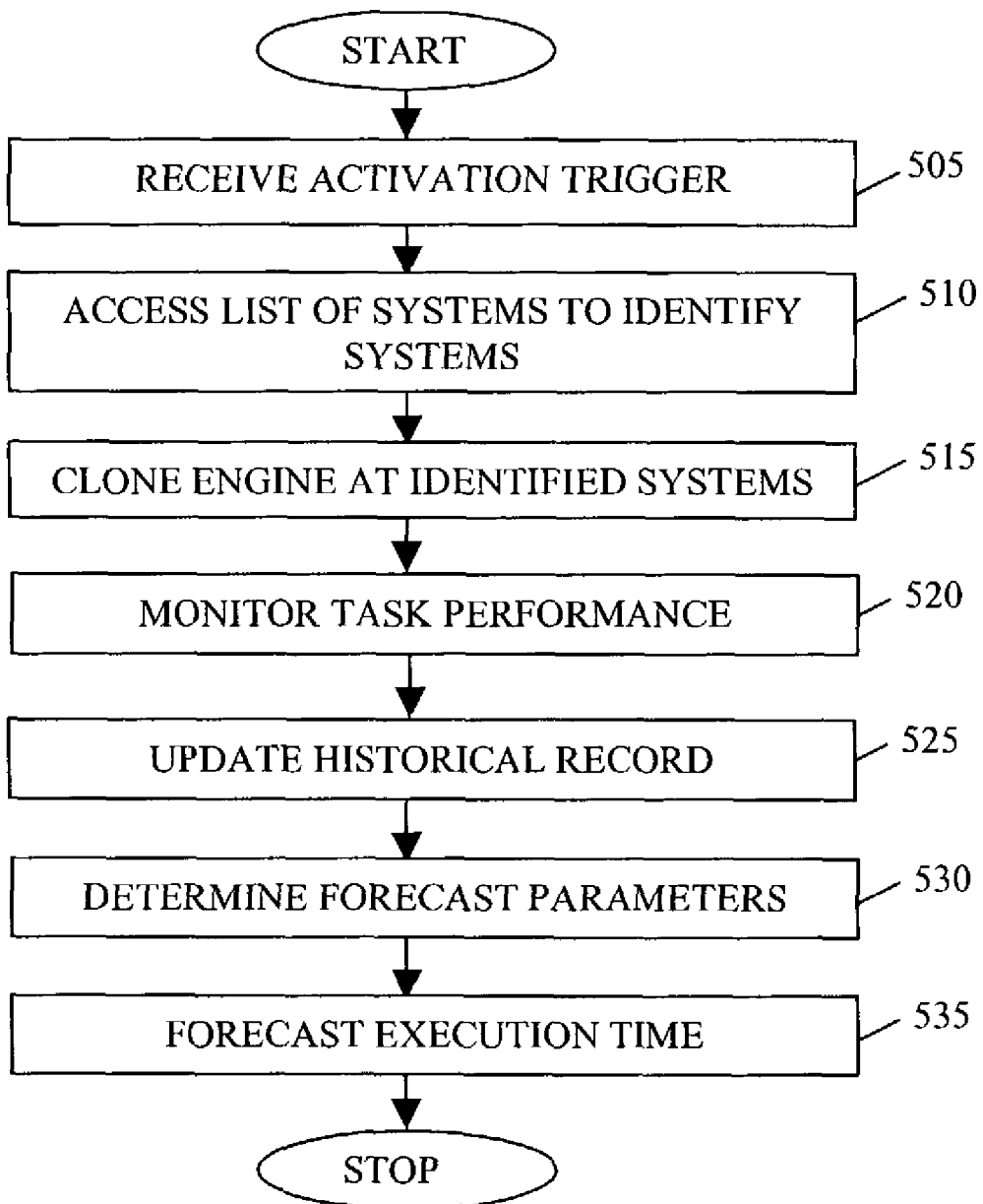
FIG. 5 illustrates management of the execution of tasks in a distributed data processing environment according to an implementation.

In one implementation, a task management engine can be distributed to one or more data processing systems in a distributed environment to manage the performance of tasks. FIG. 5 is a flow chart illustrating distribution of a task management engine and managing the performance of tasks using the distributed task management engine.

A task management engine can receive some indication that triggers the distribution of the task management engine to one or more processing systems in the distributed environment at 505. The received indication can be a user input that activates distribution or a characteristic of the distributed environment such as, e.g., the number of processing systems in the distributed environment or the volume of data traffic on a data link.

Regardless of the nature of the activating trigger, the task management engine then accesses a list of data processing systems in the distributed environment to receive information identifying other data processing systems at 510. The task management engine can clone itself at each of the identified data processing systems at 515. The task management engine can clone itself by copying all or a portion of its functionality to the other data processing systems in the distributed system. For example, task management engine can clone a forecast parameter determination unit, a forecasting unit, and a task monitoring unit at every data processing system in the distributed environment.

Figure 6:
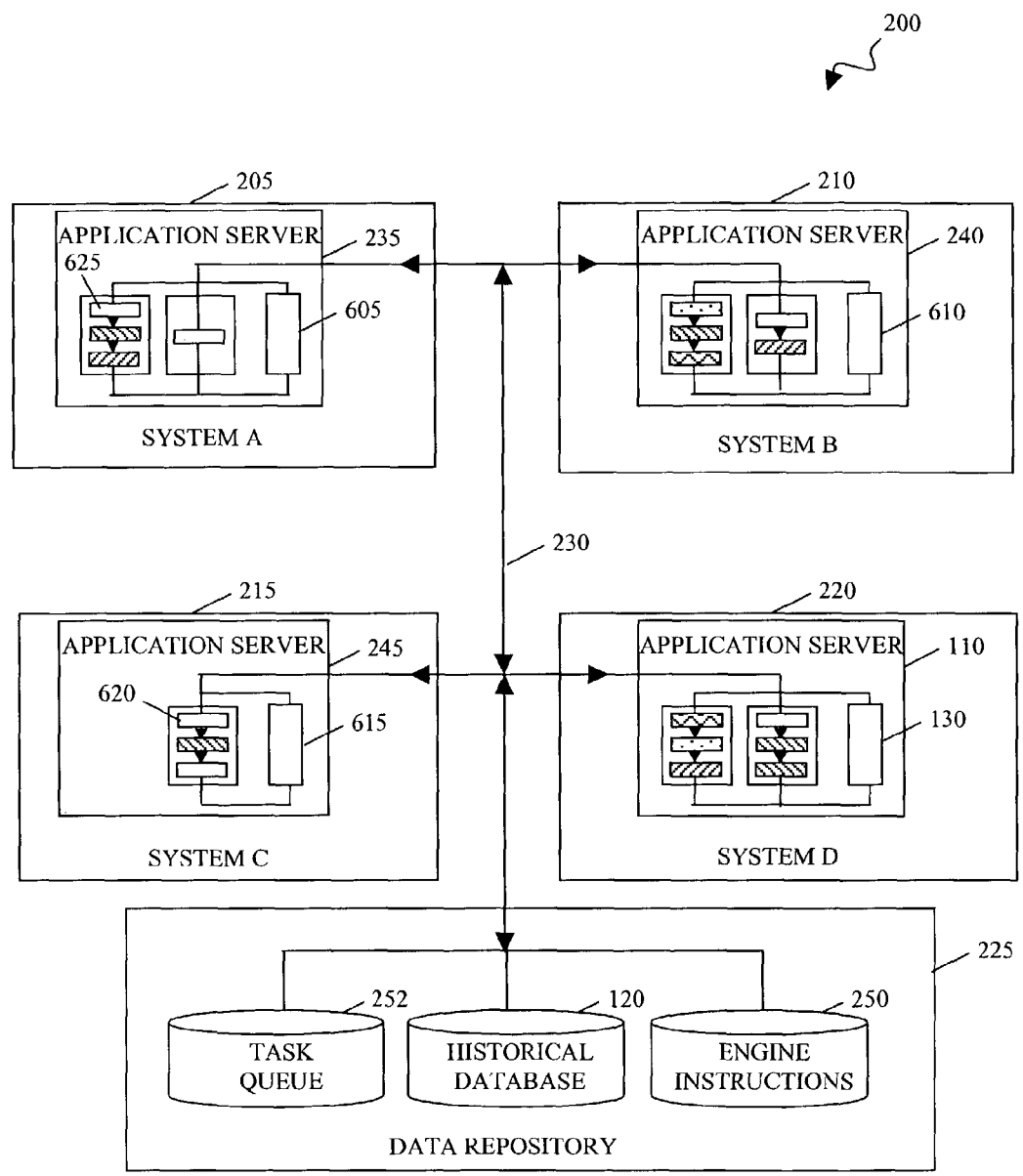
FIG. 6 is an example distributed data processing environment having a distributed task management engine.

FIG. 6 shows environment 200 after task management engine 130 has cloned itself at each of the data processing systems 205, 210, 215. In particular, application server 235 in data processing system 205 runs task management engine clone 605, application server 240 in data processing system 210 runs task management engine clone 610, and application server 245 in data processing system 215 runs task management engine clone 615.

Returning to FIG. 5, the original task management engine, along with the distributed clones, can monitor the performance of tasks in the distributed environment by collecting current information about the distributed environment at 520. Current information about the distributed environment can be received from the handling processing system or from other processing systems in the distributed environment. For example, referring to FIG. 6, cloned task management engine 605 can receive temporal information from application server 235 and server information from application server 245 that performs a monitored task 620. Current information can thus be received, in whole or in part, over data link 230. As another example, cloned task management engine 605 can time the execution of a task 625 on its own application server 110 or the execution of task 620 on application server 245.

Returning to FIG. 5, the information obtained by monitoring the performance of tasks in the distributed environment can be used to update the historical record at 525. For example, as shown in FIG. 6, cloned task management engine 605 can write information regarding the execution of task 620 on application server 245 and current information regarding environment 200 to database 120 over data link 230. With the passage of time, the current information regarding system 200 becomes a historical record suitable for inclusion in database 120 and for use in managing the performance of tasks in system 200 by any of the task management engines 605, 610, 615, 130.

Since each of the clones 605, 610, 615, along with the original task management engine 130, can write historical information to database 120, a repository of historical information is quickly and automatically produced in database 120.

Returning to FIG. 5, the original task management engine, along with any of the distributed clones, can determine forecast parameters that describe the correlation between the historical data and historical execution times in the distributed system at 530. The determined forecast parameters can be used by any of the original task management engine or the clones to forecast the execution time of tasks at any one of the data processing systems in the distributed system at 535.

Figure 7:
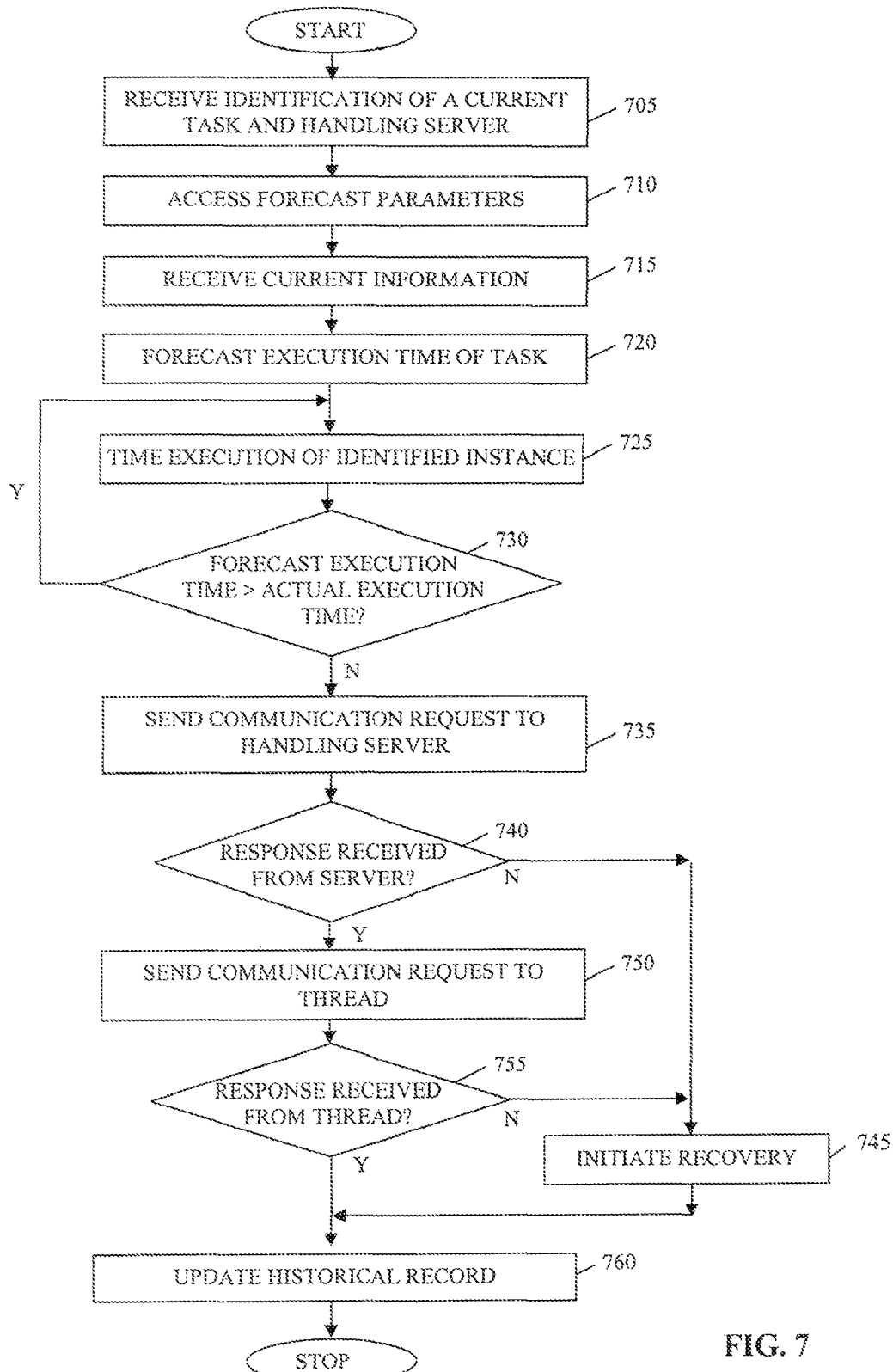
FIG. 7 illustrates management of the execution of tasks in a distributed data processing environment according to an implementation.

FIG. 7 illustrates management of the handling of tasks in a data processing environment. This task management can be performed in a distributed data processing environment, such as system 200 in FIG. 6, in which case, task management can be performed by any task management engine, including clones, in the distributed environment. The clones can perform the task management in parallel, without communicating. If one of the clones is lost or unable to communicate, the other clones can continue to manage the handling of tasks, making task management robust. Also, even a single clone of a task management engine can suffice to recover multiple crashed systems and restore a data processing environment to fully operational.

The task management engine first receives an identification of a task that is currently being handled by a data processing system in a data processing environment, as well as an identification of the handling application server at 705. The identified task can be executed on the same data processing system that handles the task management engine or on a different data processing system that is in data communication with the data processing system that handles the task management engine. The received identification can identify a class of the current task.

The task management engine also accesses forecast parameters that express the correlation between historical execution times and characteristics of the data processing environment and server during the historical executions at 710. The task management engine can itself determine the forecast parameters by accessing historical information relating to the performance of tasks. The determination of the forecast parameters can be triggered automatically by the passage of a certain period of time, or the determination of the forecast parameters can be made in response to a specific trigger such as receipt of the identification of the task and the handling server in step 705.

The task management engine also receives current information about the data processing environment and the server that handles the identified task at 715. The current information can include environment information that describes characteristics of the current load on the environment, temporal information that describes the current time, server information that describes current characteristics of the server, and task information that describes current characteristics of the task for which execution time is to be forecast. The task management engine can receive the current information from one or more data processing systems in the environment.

Using the forecast parameters and the current information about the environment and server, the task management engine then forecasts the execution time of the task at 720. The task management engine can forecast the execution time of the task using the historical correlation between execution time and information about the environment and server, and using the current information about the environment and server to predict an expected execution time for the task.

The task management engine also times the actual execution time of the task at the handling data processing server at 725. The task management engine can time the actual execution time by receiving a timestamp indicating the start time of the task. The timestamp can be received from operational updates to a historical record of the performance of tasks.

The task management engine compares the actual execution time of the task with the forecast execution time of the task at 730. If the forecast execution time is greater than the actual execution time, the task management engine continues to time the execution of the task until the forecast execution time is exceeded. Once the forecast execution time is exceeded, the task management engine sends a communication request to the data processing server handling the task at 735. The task management engine then determines if the handling data processing server responds to the communication request at 740. If the task management engine determines that it has failed to receive a response from the handling server, then the task management engine initiates recovery of the unresponsive server and the task at 745. On the other hand, if the task management engine determines that it has received a response from the handling server, then the task management engine sends a communication request to the thread at the server that includes the task at 750.

The task management engine then determines if the thread responds to the communication request at 755. If the task management engine determines that it has failed to receive a response from the thread, then the task management engine initiates recovery of the unresponsive thread and the task at 745. On the other hand, if the task management engine determines that it has received a response from the thread, then the task management engine awaits completion of the task and updates the historical record to include the unexpectedly long execution time at 760. In the case of an incomplete execution and recovery, only a timestamp indicating the start time of the incomplete execution need be added to the historical record.

Table 1 shows an activation matrix for the recovery of tasks.

TABLE 1

| FORECAST EXCEEDED? | CENTER RESPONSIVE? | THREAD RESPONSIVE? | ACTION |
|---|---|---|---|
| Y | N | — | Recover |
| Y | Y | N | Recover |
| Y | Y | Y | Wait |
| N | — | — | Wait |

Figure 8:
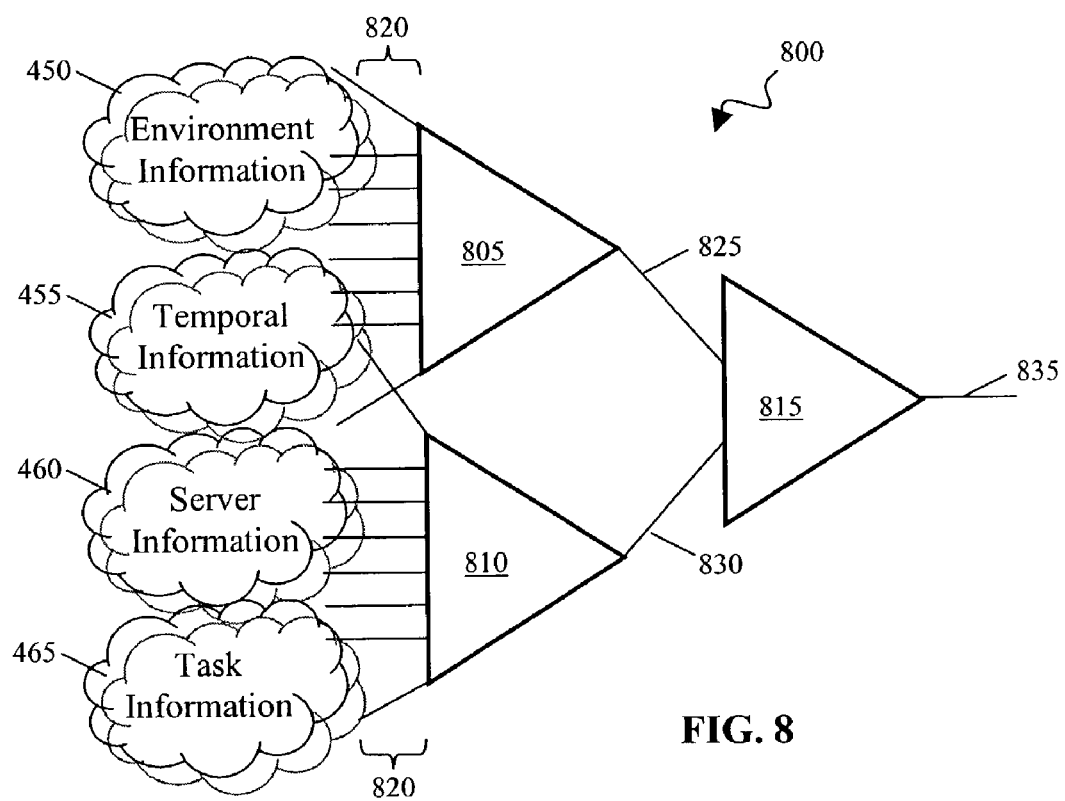
FIG. 8 is a schematic representation of another example task management engine that can forecast the expected duration of processing activities using a historical record of the performance of tasks.

FIG. 8 is a schematic representation of another task management engine 800 that can forecast the expected duration of processing activities using a historical record of the performance of tasks. Task management engine 800 is an artificial neural network (ANN) that can map input information to an output forecast of the execution time of a task. An ANN is a system of interconnected processing units that are tied together with weighted connections. The weight of a connection can, on some level, reflect the correlation between input data and output results. The weights of connections thus provides knowledge storage in a distributed memory. The weight of a connection can change in response to training or adapt over time in response to changes. The processing units in an ANN can be parallel in that the processing units can process data simultaneously. An ANN can thus have a distributed control through the system of interconnected processing units. An ANN can either be implemented in hardware or simulated using software.

Task management engine 800 includes a work load cortex 805, an execution-time estimate cortex 810, and a decision-making-for-recovery cortex 815. A cortex is a portion of the ANN that is dedicated to resolving one or more particular issues. For example, work load cortex 805 is dedicated to estimating the workload on an environment based on historical information. Execution-time estimate cortex 810 is dedicated to estimating the percent completion of a task based on historical information. Decision-making-for-recovery cortex 815 is dedicated to forecasting whether the current execution of the task has exceeded the estimated execution time.

Cortices 805, 810 can receive environment information 450, temporal information 455, server information 460, and task information 465 over a series of inputs 820. Table 2 lists specific examples of information 450, 455, 460, 465 that can be input into cortices 805, 810. Cortex 815 receives output 825 of work load cortex 805 and output 830 of execution-time estimate cortex 810 and provides an output 835 that forecasts whether the current execution of the task has exceeded the estimated execution time.

TABLE 2

| CORTEX | INPUTS |
|---|---|
| Work Load Cortex | No. HTTP Connections |
|  | Month |
|  | Week |
|  | Time of Day |
|  | Class of Task |
|  | No. of Active Tasks |
|  | Forecast Parameters Determined |
| Execution-Time Estimate Cortex | Month |
|  | Week |
|  | Time of Day |
|  | Class of Task |
|  | Forecast Parameters Determined |
|  | Server |
|  | Execution Time |

Task management engine 800 can be trained by an artificial neural network trainer to establish the weights of connections in the ANN and hence the correlation between input data and output results. The weights can be established using supervised training or unsupervised training approaches. Unsupervised training allows the weight of connections in the ANN to be determined without input from a user. Back-propagation can be used to establish the weights. Positive samples for back generation can be found in a historical record of performance. Negative samples for back-propagation can be generated by a neural network trainer if none are found in the historical record. Task management engine 800 can also use training approaches to adapt to changes in the environment or server over time. For example, weights can be constantly reestablished to accommodate changes in the load on the environment or the characteristics of a handling server.

Figure 9:
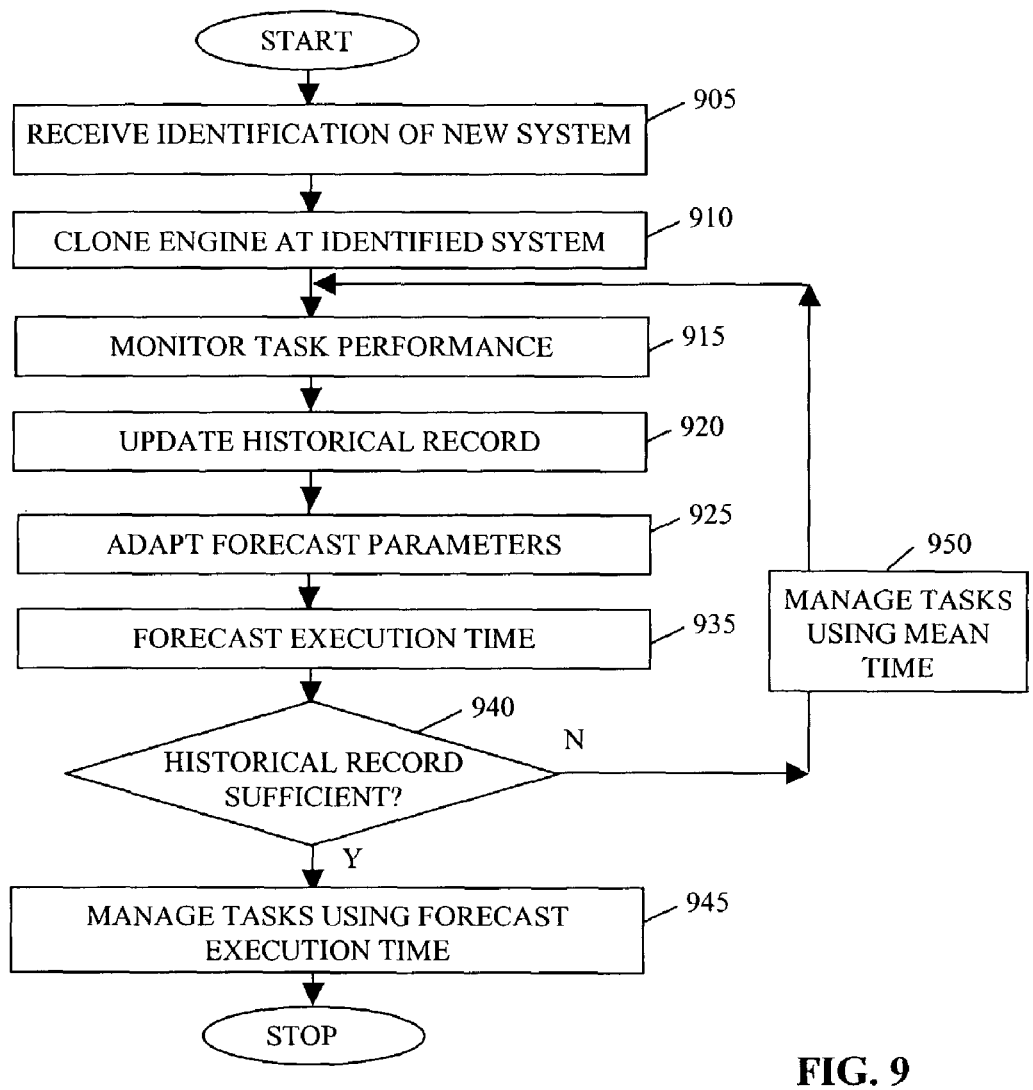
FIG. 9 illustrates an adaptation of the management of the execution of tasks to changes in a distributed data processing environment according to an implementation.

FIG. 9 is a flow chart illustrating the adaptation of the management of the execution of tasks to a change in a distributed data processing environment, namely the addition of a new data processing system to the distributed environment. This can be performed by a task management engine such as ANN task management engine 800 of FIG. 8.

The task management engine can receive an identification of the new data processing system in the environment at 905. The identification can be received when a new data processing system registers itself onto the environment. The received identification can be an address of the new data processing system. The task management engine then clones itself at the new data processing system at 910. The task management engine that clones itself, the newly formed clone, and any other clones of the task management engine at other servers (the task management engines) can then monitor the performance of tasks at the new data processing system at 915. This monitoring allows the task management engines to obtain information regarding the execution time of tasks as well as current information regarding the new data processing system and the environment itself. The task management engine or engines then update the historical record with the obtained information at 920.

The task management engines adapt their forecast parameters to reflect the updated historical record at 925. The task management engines use the adapted forecast parameters to forecast the execution time of a task at the new data processing system at 935.

Any task management engine can determine if the updated historical record is sufficient for forecasting the execution time of tasks at the new data processing system at 940. The task management engine can determine the sufficiency of the updated historical records by examining the error associated with the forecasting parameters determined from the updated historical record or by examining the error associated with a forecast of the execution time made by the task management engine.

If it is decided that the updated historical record is sufficient for forecasting the execution time of tasks at the new data processing system, then the relevant task management engine manages the execution of a task at the new data processing system using the forecast execution time at 945. However, if it is decided that the updated historical record is insufficient for forecasting the execution time of tasks at the new data processing system, then the relevant task management engine manages execution of the task at the new data processing system using a mean execution time for the task at 950. The mean execution time can be, e.g., a system-wide average execution time of the task or a user-input value that corresponds to the mean execution time anticipated by the user for the task. The relevant task management engine can manage execution of the task at the new data processing system using process 700 of FIG. 7. Table 3 shows an activation matrix for the recovery of tasks in this case.

the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the environment can be interconnected by any form or medium of digital data communication (e.g., a communication network). Examples of communication networks include a local area network ("LAN"), a wide area network ("WAN"), and the Internet.

The computing environment can include clients and servers. A client and server are generally remote from each other

TABLE 3

| RECORD SUFFICIENT? | FORECAST EXCEEDED? | MEAN EXCEEDED? | CENTER RESPONSIVE? | THREAD RESPONSIVE? | ACTION |
|---|---|---|---|---|---|
| Y | Y | — | N | — | Recover |
| Y | Y | — | Y | N | Recover |
| Y | Y | — | Y | Y | Wait |
| Y | N | — | — | — | Wait |
| N | — | Y | N | — | Recover |
| N | — | Y | Y | N | Recover |
| N | — | Y | Y | Y | Wait |
| N | — | N | — | — | Wait |

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to and typically interact through a communication network. The relationship of client and server arises by virtue of computer programs running on the respective computers and having a client-server relationship to each other.

Although only a few embodiments have been described in detail above, other modifications are possible. Another application can distribute the task management engine or record historical data regarding performance. Indeed, the functionality of the task management engine can be assigned to separate applications that interoperate. The logic flows depicted in FIGS. 5, 7, 9 do not require the particular order shown, or sequential order, to achieve desirable results. For example, the historical record can be updated prior to activation of the task management engine or cloning of the engine. In certain implementations, multitasking and parallel processing may be preferable.

Other implementations may be within the scope of the following claims.

What is claimed is:

1. A computer-implemented method comprising:
monitoring an executing task in a data processing environment comprising at least one data repository and at least one data processor, the task having an associated class and at least one historical execution time of the task stored in the data repository, wherein monitoring the executing task includes:
using an instance of a distributed application, determining an expected execution time derived using a calculation involving the task's associated class and the at least one historical execution time of the task by obtaining a correlation between the task's at least one associated historical execution time and class and historical information relating to the environment during at least one prior execution of the task, the correlation obtained by establishing weights of connections between processing units in a cortex of a statistical analysis tool;

using the instance of the distributed application, sending a request to a particular data processor handling the task for a communication from the particular data processor when an actual execution time of the executing task exceeds the expected execution time;

using the instance of the distributed application, sending the request to a thread that includes the task for a communication from the thread that includes the task upon receipt of the communication from the particular data processor responsive to the request to the particular data processor;

if a response is not received from the thread that includes the task, initiating recovery of the monitored task; and updating the historical execution time in the data repository using the actual execution time of the task in the data processing environment.

2. The method of claim 1, wherein determining an expected execution time derived using a calculation involving the task's associated class and the at least one historical execution time of the task comprises determining an expected execution time derived using a calculation involving the task's associated class and the at least one historical execution time of the task by an artificial neural network.

3. The method of claim 1, further comprising initiating recovery of the monitored task based on non-response from the data processor to the requested communication.

4. The method of claim 1, further comprising automatically determining the expected execution time.

5. The method of claim 1, wherein obtaining the correlation comprises determining the correlation.

6. The method of claim 1, wherein the correlation is obtained by establishing weights of connections between processing units in the cortex of a statistical analysis tool in an artificial neural network.

7. The method of claim 1, wherein monitoring the execution of the task comprises monitoring execution of the task on a same server that handles the instance of the distributed application.

8. The method of claim 1, further comprising non-deterministically selecting the task for execution by a server in the data processing environment.

9. The method of claim 1, wherein determining an expected execution time derived using a calculation involving the task's associated class and the at least one historical execution time of the task comprises determining an expected execution time derived using current information describing the data processing environment.

10. The method of claim 1, wherein determining an expected execution time derived using a calculation involving the task's associated class and the at least one historical execution time of the task comprises determining an expected execution time derived using a current load on the data processing environment.

11. The method of claim 1, wherein monitoring the execution of the task comprises monitoring the execution of the task in the thread executing on a data processing system in a distributed environment.

12. The method of claim 1, further comprising:

receive an indication satisfying a predefined trigger for distribution of a plurality of instances of the distributed application;

distributing, in response to the trigger, the plurality of instances of the distributed application to a plurality of processors within the data processing environment, wherein at least one instance is distributed to each of the plurality of processors in response to the trigger.

13. The method of claim 12, wherein the trigger corresponds to an occurrence of a particular event affecting an operating condition within the data processing environment.

14. The method of claim 12, wherein distributing the plurality of instances of the distributed application to a plurality of processors within the data processing environment comprises cloning a central task management engine application onto the plurality of processors.

15. The method of claim 14, wherein cloning the central task management engine application is performed by the central task management engine application and includes copying one or more functionalities of the central task management engine application onto each of the plurality of processors.

16. The method of claim 1, wherein determining an expected execution time for the task is derived using a calculation involving historical data describing conditions of a prior execution of the task, the conditions including at least one of: characteristics of a data processor involved in the prior execution of the task, a number of connections to the data processing environment during prior execution of the task, and a total number of active tasks during the prior execution of the task.

17. The method of claim 16, wherein the conditions include characteristics of the data processor involved in the prior execution of the task, the characteristics including at least one of: an identification of a class of the data processor involved in the prior execution of the task, and a load on the data processor involved in the prior execution of the task during the prior execution of the task.

18. The method of claim 16, wherein determining an expected execution time for the task is derived using a calculation involving historical data describing conditions of a plurality of prior executions of the task, the historical data including data from a plurality of data processors in the data processing environment.

19. An article comprising a machine-readable medium storing instructions operable to cause at least one machine to perform operations comprising:

forecasting an execution time of a task in a data processing environment comprising at least one data repository and at least one data processor using a calculation involving an associated class of the task and historical task execution times of the task stored in the data repository as input into a statistical analysis tool comprising multiple interconnected processing elements, the forecast obtained by a correlation between the task's at least one associated historical execution time and class and historical information relating to the environment during at least one prior execution of the task, the correlation obtained by establishing weights of connections between processing elements in a cortex of the statistical analysis tool;

using an instance of a distributed application, sending a request to a particular data processor handling the task for a communication from the particular data processor when an actual execution time of the task exceeds the forecast execution time;

using the instance of the distributed application, sending the request to a thread that includes the task for a communication from the thread that includes the task upon receipt of the communication from the particular data processor responsive to the request to the particular data processor;

if no response is received from the thread, initiating recovery of the task; and updating the historical execution time in the data repository using the actual execution time of the task in the data processing environment.

20. The article of claim 19, wherein forecasting the execution time comprises forecasting the execution time using the historical task execution times and the class of the task as input into an artificial neural network.

21. The article of claim 19, wherein forecasting the execution time comprises estimating a workload on the data processing environment.

22. The article of claim 21, wherein estimating the workload comprises estimating the workload based on current information regarding the data processing environment as input into the cortex of the statistical analysis tool, the cortex including multiple interconnected processing elements.

23. The article of claim 19, wherein forecasting the execution time comprises estimating a percent completion of the task.

24. The article of claim 23, wherein estimating the percent completion comprises estimating the percent completion based on the class of the task and the historical task execution times as input into the cortex of the statistical analysis tool, the cortex including multiple interconnected processing elements.

25. The article of claim 19, wherein servicing the task comprises assessing when to initiate recovery of the task based on the forecast execution time.

26. The article of claim 19, wherein servicing the task comprises initiating recovery of the task.

27. The article of claim 19, wherein the operations further comprise servicing the task based on non-response from the data processor to the requested communication.

28. The article of claim 19, wherein obtaining the correlation further comprises determining the correlation between the historical task execution times and the class of the task in the prior executions and historical information relating to the data processing environment during the prior executions as input into the statistical analysis tool comprising multiple interconnected processing elements.

29. The article of claim 19, wherein forecasting the execution time further comprises forecasting the execution time of the task using information relating to the data processing environment during a present execution.

30. The article of claim 29, wherein forecasting the execution time further comprises forecasting the execution time of the task using information relating to an application server handling the task.

31. A system comprising:

multiple application servers in a distributed data processing environment, each of the multiple application servers including a hardware processor, the data processing environment running multiple instances of a recovery engine that collaboratively monitor tasks in the multiple application servers and determine expected task execution times derived using a calculation involving associated task classes and historical task execution times corresponding to the tasks by obtaining correlations between tasks' associated historical execution times and class and historical information relating to the environment during prior executions of the tasks, the correlations obtained by establishing weights of connections between processing units in a cortex of a statistical analysis tool, the instances of the recovery engine:

requesting communications from application servers handling particular tasks when actual execution times of the tasks exceed the corresponding expected task execution times, requesting communication from threads that include the particular tasks upon receipt of a corresponding communication from the application server handling the particular tasks, and initiating recoveries of the particular tasks based on non-responses from the threads in response to a requested communication from the thread; and a historical database communicatively coupled with the multiple instances of the recovery engine, the historical database comprising the associated task classes and historical task execution times.

32. The system of claim 31, wherein the multiple instances of the recovery engine collaboratively monitor the tasks without direct communication until a problem is detected.

33. The system of claim 31, wherein the expected task execution times comprise a historical execution time related to a class of a specific task and to a handling application server among the multiple application servers.

34. The system of claim 33, wherein an instance of the recovery engine comprises a forecast parameter determination unit to determine a correlation between multiple historical execution times and handling application servers for the class of the specific task.

35. The system of claim 34, wherein the forecast parameter determination unit comprises a trainer of an artificial neural network.

36. The system of claim 31, wherein the historical database includes historical task data written into the historical database by the multiple instances of the recovery engine.

37. The system of claim 31, wherein the multiple instances of the recovery engine comprise clones of the recovery engine.

38. The system of claim 37, wherein the clones are clones of a central recovery engine including a set of functionalities, and the clones include less than all the functionalities in the set.

* * * * *